United States Statutory Invention Registration [19]

[11] Reg. Number: H126

Allen et al. [45] Published: Sep. 2, 1986

[54] RANDOM BEAM POSITIONING SURVEILLANCE PROCESS

[75] Inventors: Michael G. Allen, Clarksville; Howard Faecher, Baltimore; Dennis H. McCallam, Randallstown, all of Md.

[73] Assignee: The United States of America as represented by the Secretary of the Army, Washington, D.C.

[21] Appl. No.: 841,083

[22] Filed: Feb. 18, 1986

[51] Int. Cl.[4] ..... G01S 13/00

[52] U.S. Cl. ..... 343/16 R; 343/18 E

*Primary Examiner*—Stephen C. Buczinski
*Assistant Examiner*—Linda J. Wallace
*Attorney, Agent, or Firm*—Anthony T. Lane; Sheldon Kanars; John K. Mullarney

[57] ABSTRACT

Random beam positioning for an E-scan radar system having an electronically steerable antenna is controlled by a digital computer which is programmed to generate lists or files of portions of the desired area of surveillance. Two separate lists are generated corresponding to the forward and rear postions of the area of coverage. These lists are thereafter independently randomized and combined to generate beam position commands for the desired surveillance region, thereby providing full radar coverage over a desired region while decreasing the probability of being tracked by an undesired detector.

20 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RANDOM BEAM POSITIONING SURVEILLANCE PROCESS

STATEMENT OF GOVERNMENT RIGHTS

The Government has rights in this invention pursuant to Contract No. DAAK20-82-C-0965 ordered by the Department of the Army.

BACKGROUND OF THE INVENTION

This invention relates to radar beam steering and more particularly to a method and apparatus for randomly positioning a radar beam over a predetermined area.

While surveillance radar systems including electronically steerable antennas are generally known, if an electronic countermeasure (ECM) system can predict when a radar beam will radiate in a certain region, the ECM system can pinpoint the location to direct a jamming signal to the radar. Accordingly, in the deployment of surveillance radar systems, the effort to remain undetected by electronic countermeasures equipment can provide a substantial edge in the information gathering process. In order to make this process efficient and feasible, certain constraints must be imposed, namely: the radar system must be able to position the surveillance beam by electronic rather than mechanical means; and a process is required that can provide full coverage to the surveillance area but in an ECM defeating manner.

It is an object of the present invention, therefore, to provide an improved method of positioning a radar beam.

It is a further object of the invention to provide an improvement in positioning the beam of a surveillance radar.

It is another object of the invention to provide an improved method for positioning a radar beam so as to render the radar relatively invulnerable from electronic countermeasures.

It is yet another object of the invention to provide an improved method of providing random beam positioning of a scanned radar beam.

SUMMARY

Briefly, the foregoing and other objects of the invention are provided by a random beam positioning algorithm, particularly for an E-scan radar which permits full radar coverage over a desired region of surveillance while decreasing the probability of being electronically tracked by electronic countermeasures equipment. This is provided by electronically steering the radar antenna beam in a random manner while taking into account the desired scan angle width and movement of the radar platform, typically an aircraft. Where the aircraft is moving in a forward direction and the radar comprises a side-looking radar, there must be assurances that the rear areas, at the end of the scan, are covered before the radar has moved to a position where the beam cannot be placed. Accordingly, the method of randomly positioning the radar beam is carried out by a programmed radar control computer which generates angle pointing commands applied to a beam steering controller in accordance with a computer program which first computes all the beam positions that will ensure full coverage of the desired region followed by determining the size of the swath required. Next both rear and forward areas of view are computed and lists for these beam positions are generated and independently randomized and then combined from which beam position commands are generated for an electronically steerable antenna.

BRIEF DESCRIPTION OF THE DRAWINGS

While the present invention is defined in the claims annexed to and forming a part of the specification, a better understanding can be had by reference to the following description when taken in conjunction with the accompanying drawings in which:

DETAILED DESCRIPTION OF THE INVENTION

The invention hereinafter described is intended to provide E-scan radars with a search and/or surveillance radar beam positioning capability which counters the threat of electronic countermeasure (ECM) equipment by substantially reducing if not entirely removing the time required for ECM equipment for locking on and interfering with the radar surveillance process.

Figure 1:
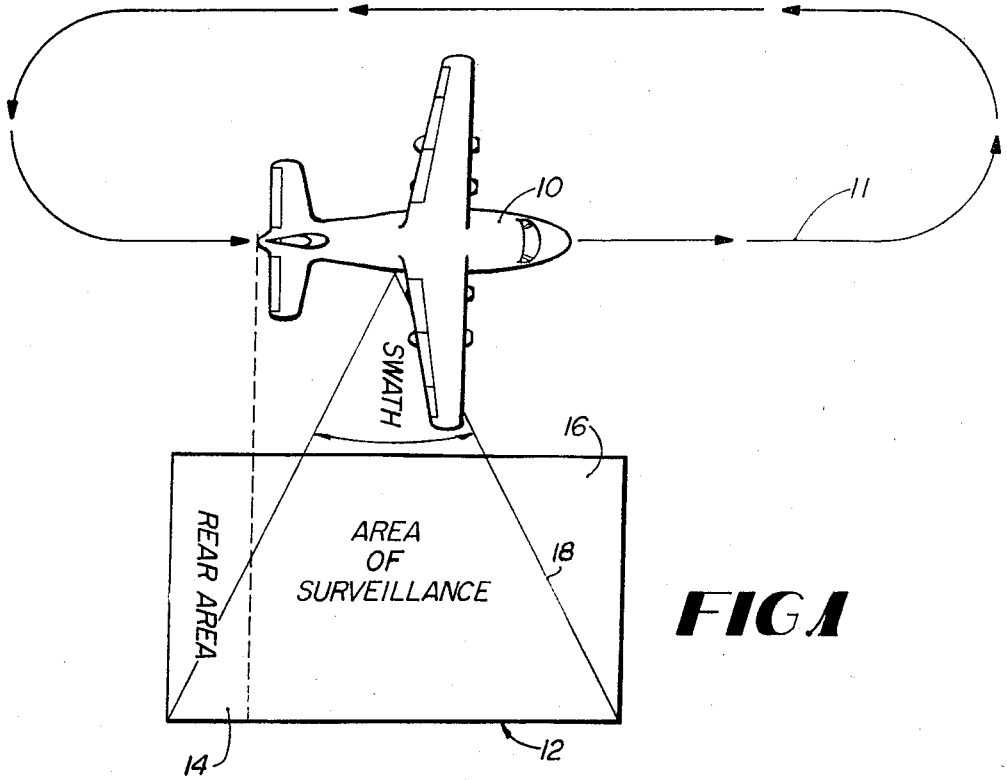
FIG. 1 is a diagram illustrative of the operation of an airborne side-looking surveillance radar.

Referring now to the drawings and more particularly to FIG. 1, reference numeral 10 denotes a radar platform which may be, for example, an aircraft. As shown, the aircraft 10 carries a side-looking (E-scan) surveillance radar, not shown, and flies an elongated closed course 11 back and forth in a racetrack fashion along a predetermined region which includes an area of surveillance 12 including an area to the rear of the aircraft 14 and the remaining area 16 forward of the aircraft. Further as shown in FIG. 1, a surveillance swath 18 is provided by the surveillance radar and comprises the resultant coverage provided by a plurality of individual beams which are randomly positioned in accordance with the algorithm shown in FIG. 3. Frequency control for each beam, moreover, is furthermore intended so that frequency diversity can also be provided when desired.

Figure 2:
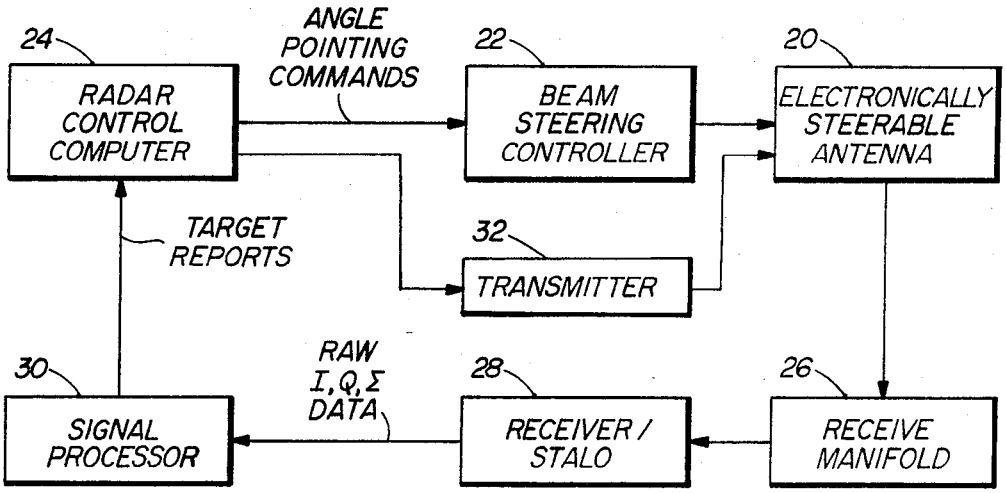
FIG. 2 is a simplified block diagram illustrative of radar apparatus which utilizes the method of the subject invention.

Referring now to FIG. 2, shown therein is a simplified block diagram of a radar system which includes an electronically steerable antenna 20. The directivity of the radiated beam, not shown, is controlled by a beam steering controller 22 having angle pointing command signals generated by and coupled thereto from a control computer 24. The computer 24 includes a set of instructions implemented in software which among other things, carries out the method for randomly positioning the plurality of beams radiated from the electronically steerable antenna 20 in accordance with the method set forth in the flow chart of FIG. 3. The radar returns from the randomly positioned beams over the swath 18 shown in FIG. 1 are coupled to a receive manifold 26 where the RF signals received are fed to receiver apparatus 28 having a STALO (stay locked on) capability. The receiver 28 is adapted to provide I, Q and $\Sigma$ radar return data, in a well known fashion, to a digital signal processor 30 which accepts the data and formulates target report signals which are fed back to the computer 24 as well as to other peripheral equipment, not shown, and which may include target display apparatus. The computer 24, moreover, provides radar time line sequencing which controls, among other things, the transmitter portion 32 of the radar which couples RF signals to be radiated to the steerable antenna 20.

Figure 3:
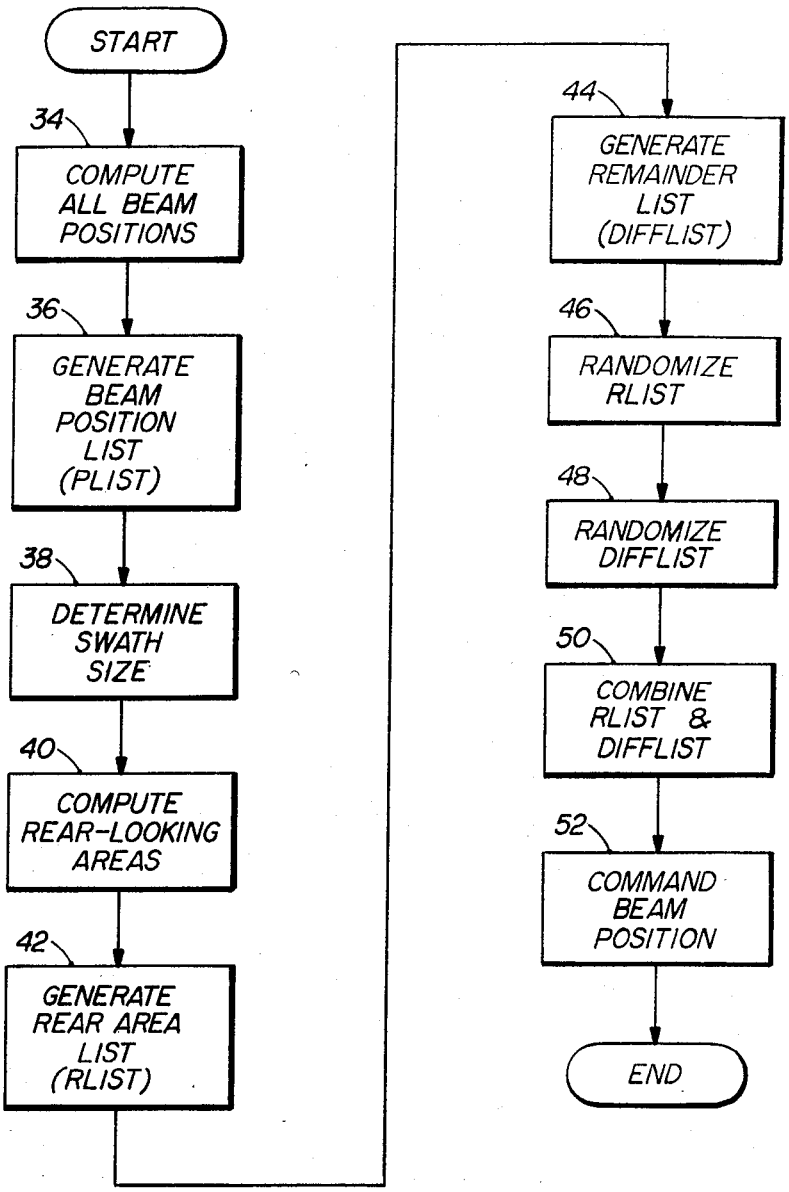
FIG. 3 is a diagram illustrative of a flow chart of the method for randomly positioning the beam in accordance with the subject invention.

Referring now to FIG. 3, shown thereat is a flow chart which as noted above is implemented in the software of the computer 40 and comprises an instruction set which formulates angle commands that are sent to the antenna beam steering controller 22 for directing the radiation from the electronically steerable antenna 20. Electronically steerable antennas are well known and may be comprised of, for example, a phased array type of antenna.

The method of random beam positioning first comprises a step 34 which involves computing all the beam positions which will ensure full coverage of the region including the total area of surveillance 12. This includes generating a list or file (PLIST) of all the beam positions and, when desired, frequencies away from a given beam width positioned at boresight or 0°. A list or file is like data stored in a dedicated portion of memory in a data processor. The list contains unit vectors, indicating the center of the respective beam position, and associated beam widths for the unit vectors. The arc that the plurality of adjacent beams cover correspond to the area or swath 18 that is to be scanned. The respective beam centers for the plurality of beams to be randomly directed are generated in accordance with the following equation:

$$BC_{x+1}=(BW_{x+1}\times 0.5)+BX_x+(BW_x\times 0.5)$$

where BC is the beam center and BW is the beam width. The beam widths increase proportionately as the angle off of boresight increases and accordingly there will be a slight overlap of adjacent beams.

Once the PLIST is generated, the next step 38 comprises determining the size of the surveillance swath 18 desired and which includes a predetermined number of beam positions in the PLIST for each scan. Since a side-looking (E-scan) antenna is passing over the region 12, certain rear-looking areas 14 may have left the field of view before the aircraft completes a pass around its flight path 11, i.e. the racetrack path referred to in FIG. 1. In order to ensure that these areas are observed, a step 40 is next included which computes all beam positions for the rear-looking area aft of the aircraft as a function of swath size and aircraft velocity along the flight path from which a rear area beam position list (RLIST) is generated as shown by reference numeral 42. Having generated the RLIST, a list of the remainder i.e. forward portion of the area 16 of surveillance 12 is generated by subtracting the RLIST from the PLIST which for purposes of explanation, is defined as the DIFFLIST. This step is shown in FIG. 3 by reference numeral 44. Next the rear area list RLIST is randomized as evidenced by step 46 followed by an independent randomization of the DIFFLIST which as noted above represents those portions of the coverage area that are constantly in the field of view along with the forward beam positions that will be appearing in the field of view as the radar platform 10 moves along its course. This is shown by step 48. Following this, the randomized version of both the RLIST and DIFFLIST are combined, in a predetermined manner, as shown by reference numeral 50. More particularly, and in accordance with the preferred embodiment of the invention, the randomized lists are combined in sequence, with the random RLIST appearing first in the combined list 50. This insures that the rear area will be dealt with (i.e., randomly scanned) first. Alternatively, the RLIST can be entered into the combined list table in triplicate, for example, thereby increasing the probability of the rear beam positions being used first. The combined randomized list represents the new ordering of the surveillance swath coverage. From the combined list, a plurality of random beam positions are commanded by the beam steering controller as shown by reference numeral 52.

Thus once the list of all the beam positions is formulated, the vector/width pairs are randomly positioned taking into account both the rear and forward areas under surveillance. Again and although not specifically shown, random frequencies can be utilized along with the random beam positions. With random beam positioning being implemented as described, the radar system forces any ECM systems acting against the radar system to transmit in a more broadband region since the "radar revisit" interval is now random. When this occurs, however, the ECM system becomes vulnerable to the home-on-jam type of counter-counter measures (CCM) which may also include weaponry. Where random frequencies are also transmitted, it further complicates the ECM process since now not only is the radar revisit interval random, the radar broadcast frequency is random. This forces the potential ECM system to boost jamming power on some or all of the observed radar frequencies. By forcing the ECM system to adopt more power transmission, it becomes even more vulnerable to defeat.

Thus, what has been shown and described is a random beam position method which provides E-scan radars with a search/surveillance beam positioning technique that does not permit ECM equipment operating against the radar adequate time to lock on while still providing the radar with accurate search/surveillance information.

Having thus shown and described what is at present considered to be the preferred method, it should be understood that the same has been shown by way of illustration and not limitation. Accordingly, all modifications, alterations and changes coming within the spirit and scope of the invention as defined in the appended claims are herein meant to be included.

We claim:

1. A method for randomly positioning a scanned beam of radiation in a swath type of scan pattern over a predetermined area comprising the steps of:

computing a plurality of beam positions which will insure full coverage of said predetermined area;

controlling the size of the swath type of scan pattern to include a predetermined number of said beam positions;

generating at least one computer usable list of said plurality of beam positions for utilization by a computer which controls an electronically steerable antenna;

randomizing said at least one list of beam positions; and controlling said electronically steerable antenna by said computer in accordance with the randomized list.

2. The method of claim 1 and additionally including the step of assigning a predetermined frequency of transmission for each of said beam positions.

3. The method of claim 2 wherein said step of assigning a frequency comprises assigning random frequencies for each of said beam positions.

4. The method of claim 1 wherein said step of generating at least one computer list comprises generating first and second lists of said beam positions, said first list comprising the beam positions for one portion of said predetermined area and said second list comprising the beam positions for the remainder of said predetermined area, and wherein said step of randomizing comprises separately randomizing said first and second lists.

5. The method of claim 4 and additionally including the step of combining the randomized first and second list into a composite randomized list and thereafter controlling said electronically steerable antenna thereby.

6. The method of claim 5 wherein said beam of radiation comprises a radar beam.

7. The method of claim 6 wherein said radar beam comprises a radar beam emanating from a side-looking radar located on a moving platform.

8. The method of claim 7 wherein said one portion of said predetermined area is relatively smaller than the remainder of said predetermined area.

9. The method of claim 8 wherein said one portion of said predetermined area comprises a rear-looking area in the field of view of said side-looking radar and said remainder comprises the side and forward looking areas thereof.

10. The method of claim 9 wherein said rear looking area is determined by the size of the scan pattern and velocity of said platform.

11. The method of claim 10 wherein said moving platform comprises an aircraft.

12. Apparatus for randomly positioning a scanned radar beam in a swath type of scan pattern over a predetermined area by an electronically steerable antenna, comprising:

computer means operable to generate at least one list of a plurality of beam positions which will insure full coverage of said predetermined area and including a memory for storing said list of beam positions;

means for randomizing said at least one list of beam positions and storing the randomized list in said memory; and means coupled to said computer for controlling said electronically steerable antenna in accordance with the randomized list.

13. The apparatus of claim 12 wherein said computer means is operable to generate first and second lists of said beam positions which are stored in said memory, said first list comprising the beam positions for one portion of said predetermined area and said second list comprising the beam positions for the remainder of said predetermined area, and additionally including means for separately randomizing said first and second lists.

14. The apparatus of claim 13 and additionally including means for combining the randomized first and second list into a composite randomized list for controlling said electronically steerable antenna.

15. The apparatus of claim 14 wherein said radar beam comprises a radar beam emanating from a side-looking radar located on a moving platform.

16. The apparatus of claim 15 wherein said one portion of said predetermined area is relatively smaller than the remainder of said predetermined area.

17. The apparatus of claim 16 wherein said one portion of said predetermined area comprises a rear-looking area in the field of view of said side-looking radar and said remainder comprises the side and forward-looking areas thereof.

18. The apparatus of claim 17 and additionally including means for controlling the size of the swath type scan pattern and wherein said rear-looking area is determined by the size of the scan pattern and velocity of said platform.

19. The apparatus of claim 12 and additionally including means for assigning a predetermined frequency of transmission for each of said plurality of beam positions.

20. The apparatus of claim 19 wherein said means for assigning a frequency includes means for assigning random frequencies for each of said beam positions.

* * * * *